United States Patent

Shultz et al.

[11] Patent Number: 5,670,237
[45] Date of Patent: Sep. 23, 1997

[54] METHOD FOR MAKING A SURFACE COVERING PRODUCT AND PRODUCTS RESULTING FROM SAID METHOD

[75] Inventors: Jeffrey R. Shultz, Wilmington, Del.; Barry C. Crispin, Bridgeton, N.J.

[73] Assignee: Mannington Mills, Inc., Salem, N.J.

[21] Appl. No.: 479,969

[22] Filed: Jun. 7, 1995

[51] Int. Cl.$^6$ ............... B05D 1/38; B05D 3/12; B05D 5/06; B32B 5/16

[52] U.S. Cl. ............... 428/173; 427/198; 427/203; 427/359; 427/366; 428/187

[58] Field of Search ................ 427/194, 195, 427/197, 198, 202, 359, 203, 356, 366, 412.1, 407.1; 264/DIG. 31, 293, 294; 428/166, 168, 173, 161, 187

[56] References Cited

U.S. PATENT DOCUMENTS

| | | | |
|---|---|---|---|
| 289,917 | 12/1883 | Koskul | 428/48 |
| 1,180,516 | 4/1916 | McIndoe | 428/162 |
| 1,441,861 | 1/1923 | Lehon | 428/167 |
| 1,574,890 | 3/1926 | Hofmann | 427/198 |
| 1,630,085 | 5/1927 | Humphreys et al. | 428/173 |
| 1,691,708 | 11/1928 | Egleson | 428/163 |
| 1,873,098 | 8/1932 | Young | 428/167 |
| 1,897,458 | 2/1933 | Whitney | 156/268 |
| 2,032,405 | 3/1936 | Fischer et al. | 428/173 |
| 2,279,770 | 1/1942 | Robbins | 362/98 |
| 2,307,734 | 1/1943 | De Vault | 428/148 |
| 2,917,780 | 12/1959 | Petry | 264/76 |
| 2,917,781 | 12/1959 | Petry | 264/76 |
| 3,192,063 | 6/1965 | Donofrio | 427/195 |
| 3,652,317 | 3/1972 | Della Porta et al. | 117/22 |
| 3,682,738 | 8/1972 | Smith | 156/283 |
| 3,793,125 | 2/1974 | Kunz | 156/62.2 |
| 3,846,219 | 11/1974 | Kunz | 161/119 |
| 3,956,530 | 5/1976 | McKee, Jr. et al. | 427/195 |
| 3,958,043 | 5/1976 | McKee, Jr. et al. | 427/195 |
| 4,212,691 | 7/1980 | Potosky et al. | 156/79 |
| 4,255,480 | 3/1981 | Scher et al. | 428/208 |
| 4,325,177 | 4/1982 | DePoorter | 29/458 |
| 4,469,645 | 9/1984 | Eigenmann | 264/1.6 |
| 4,595,622 | 6/1986 | Schaefer | 428/173 |
| 4,797,315 | 1/1989 | Balmer et al. | 428/167 |
| 4,816,317 | 3/1989 | Balmer et al. | 428/167 |
| 4,816,318 | 3/1989 | Dorsey et al. | 428/167 |
| 4,816,319 | 3/1989 | Dees, Jr. et al. | 428/167 |
| 4,881,999 | 11/1989 | Balmer et al. | 156/231 |
| 5,204,160 | 4/1993 | Rouser | 428/167 |
| 5,209,949 | 5/1993 | Osada | 427/198 |

FOREIGN PATENT DOCUMENTS

| | | | |
|---|---|---|---|
| 1083896 | 8/1980 | Canada. | |
| 29 26 983 | 1/1981 | Germany. | |
| 2-19260 | 5/1990 | Japan. | |
| 5-42652 | 8/1991 | Japan | 427/198 |
| 4-5365 | 1/1992 | Japan. | |
| 2215266 | 9/1989 | United Kingdom. | |

*Primary Examiner*—Benjamin Utech
*Assistant Examiner*—Fred J. Parker
*Attorney, Agent, or Firm*—Finnegan, Henderson, Farabow, Garrett & Dunner, L.L.P.

[57] ABSTRACT

The present invention discloses surface covering products and methods and an apparatus for making surface covering products. In particular, the method of the present invention includes depositing color particles on a moving carrier to form a base layer. The base layer then comes in contact with a patterned embossing device such as a roll to create a depressed or displaced pattern image on the base layer. Afterwards, accent particles or pellets are sprinkled or applied over the embossed base layer. The embossed base layer is subjected to heat and/or pressure to consolidate the accent and color particles and form a preformed mass. The preformed mass is then pressed to form a fused, texture-created structure. The surface covering products made from the process of the present invention have unique geometric patterns with well-defined grout lines or irregular decorative designs.

38 Claims, 8 Drawing Sheets

1

METHOD FOR MAKING A SURFACE COVERING PRODUCT AND PRODUCTS RESULTING FROM SAID METHOD

BACKGROUND OF THE INVENTION

The present invention relates to surface covering products and a method and an apparatus for making the surface covering products (e.g., decorative inlaid floor coverings) having decorative designs. More particularly, the present invention relates, in part, to a unique method for producing surface covering products with great versatility for styling development. Geometric patterns with well defined grout lines or irregular decorative design with multiple color pellets are easily achievable by the present invention.

A typical stencil screen process is described in U.S. Pat. No. 4,076,567. The stencil operation requires a series of pattern screens disposed above the travel path of the conveyor means. Each of the pattern screens includes a cover sheet having at least a single contoured pattern opening corresponding in outline configuration to a pattern to be produced in the final product.

Such a stencil operation is disadvantageous because it is a "stop and go" operation. In addition, pattern changes in a stencil production line are time consuming. Also, stencil screens are expensive to design and make. Thus, producing numerous designs can be an expensive proposition. Also, stencil operation can, at times, encounter the problem of unintentionally deforming, smearing, and/or destroying the design during pattern forming. This occurs from improper contact of a subsequent pattern screen on the stopped or moving carrier containing the base layer.

Accordingly, there is a need for an improved process for making a decorative surface covering that avoids or overcomes the problems and disadvantages of standard stencil operations.

SUMMARY OF THE INVENTION

A feature of the present invention is to provide a continuous running process for making surface covering products which does not require a "stop and go" operation.

An additional feature of the present invention is to provide a process for making surface covering products which can make a pattern with, for example, one or a few embossing rolls instead of numerous stencil screens.

Also, a feature of the present invention is to provide an apparatus and method for making surface covering products which allows easy and quick pattern changes and permits an inexpensive way compared to stencil screens for making the pattern on the surface covering.

An additional feature of the present invention is to provide a method for making a surface covering which does not unintentionally deform, smear, or destroy the design placed on the moving carrier.

A further feature of the present invention is to provide a surface covering product having geometric patterns with well-defined grout lines or irregular decorative designs with color pellets.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawings and appended claims.

To achieve these and other advantages and in accordance with the purpose of the present invention, as embodied and broadly described herein, the present invention relates to a method for making surface covering products. In the method, color particles are deposited on a carrier to form a base layer. The base layer then comes in contact with at least one displaced mechanism device (e.g., patterned embossing roll) to create a depressed or displaced pattern image on the base layer. Afterwards, accent particles are applied (e.g., sprinkled) over the depressed or displaced base layer to fill in the depressed or displaced pattern image. The depressed or displaced base layer is then subjected to heat and/or pressure to consolidate the accent particles with the base layer (e.g., to cause a partial welding or fusion together of the individual particles) and to form a preformed mass having the desired sheet configuration and decorative design. The sintered resin sheet is then pressed to form a completely fused, uniform, and texture-created sheet structure. The sheet can be annealed and then cooled and sealed with a proper coating to enhance surface properties such as stain, scuff, gloss appearance and gloss retention performance.

The present invention further relates to a surface covering product made from the above-described process.

In addition, the present invention relates to an apparatus for making a surface covering product which includes means for depositing color particles on a carrier to form a base layer; means for forming a depressed or displaced pattern image on the base layer; means for depositing accent particles over the depressed or displaced pattern image on the base layer; means for consolidating the accent particles and the base layer into a preformed mass; and means for pressing the preformed mass in order to form a fused, uniform, texture-created structure.

A preferred apparatus for making the surface covering product includes a first pellet dispenser, at least one displaced mechanism device such as a pattern embossing roll, a second pellet dispenser, and an embossing roll or plate.

It is to be understood that both the foregoing general description and the following detailed description are exemplary and explanatory only and are intended to provide further explanation of the present invention, as claimed.

The accompanying drawings, which are incorporated in and constitute a part of this specification, illustrate one embodiment of the present invention and together with the description, serve to explain the principles of the present invention.

DETAILED DESCRIPTION OF THE PRESENT INVENTION

Figure 1A:
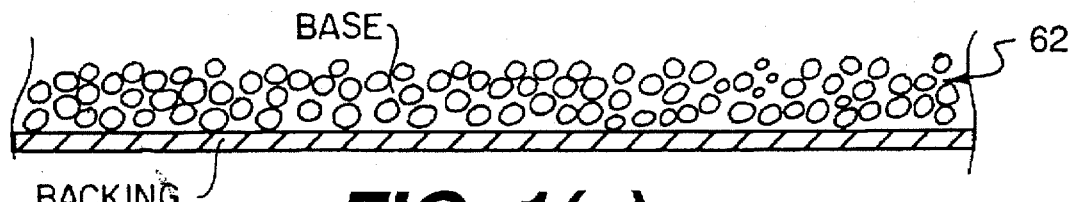
FIGS. 1(a)–(e) are enlarged side views of a surface covering of the present invention in various stages of development.

Reference will now be made in detail to the embodiments of the present invention, including preferred aspects, examples of which are illustrated in the accompanying drawings. Wherever possible, the same reference numerals will be used throughout the drawings to refer to the same or like parts.

The term surface coverings is meant to include, but not be limited to, floor coverings, wall and ceiling coverings, countertops, laminates, and any other surface to be covered with the decorative surface coverings of the present invention. Specific examples of surface coverings would include, but not be limited to, wallpaper, vinyl inlaid floors, and the like.

Figure 2:
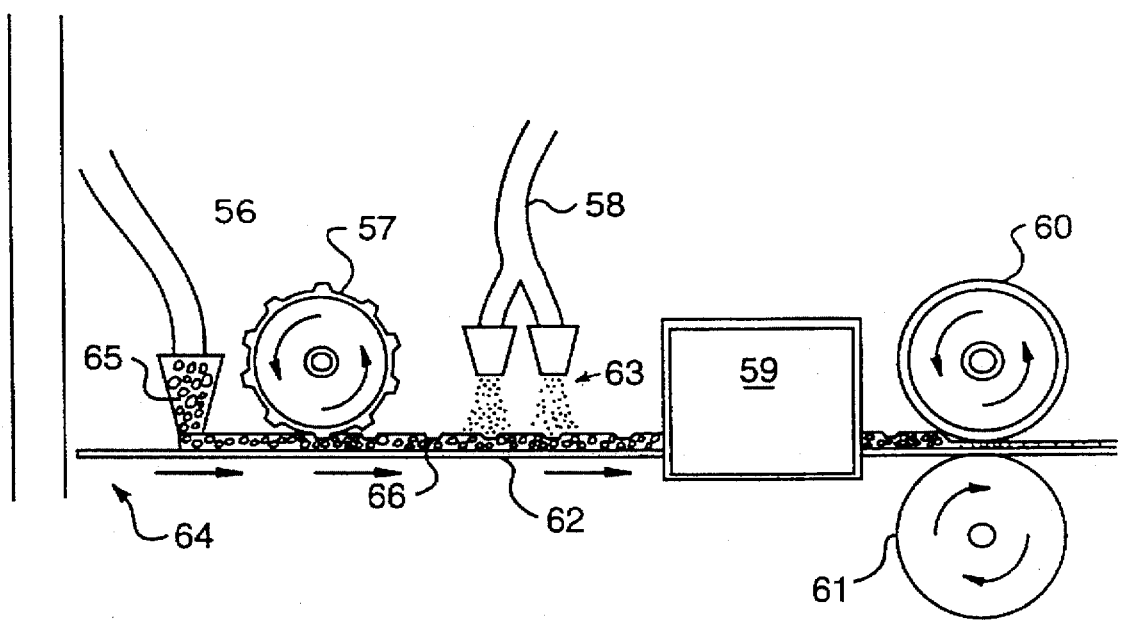
FIG. 2 is a drawing of the preferred equipment used in the process to make surface coverings of the present invention.

The method of making the surface covering product will now be described in detail. As shown in FIGS. 1(a) and 2, using a carrier, preferably a moving carrier (64) (e.g., a Teflon® belt), as that term is understood to those skilled in the art, color particles (i.e., single color or multi-color blends of particles or transparent PVC particles or mixtures thereof) (65) are deposited on the carrier (64) to form a base layer (62). The line speed can be any speed used in this industry, but normally is from about 15 to about 30 f.p.m. The color particles can comprise one or more colors.

The color particles used to form the base layer are preferably particles traditionally used in the flooring industry to make a base layer, such as highly filled PVC pellets with one or more colors blended together with PVC resin or polymer (e.g., copolymer), plasticizer, and heat stabilizer.

As will be discussed in detail later, accent particles are deposited on top of the depressed or displaced image formed on the base layer comprising the color particles. Accent particles can be any particles that have the ability to create a visual effect.

One type of accent particle that can be used includes color particles. These color particles can be any color or shade of color. Preferably, a typical formulation of accent particles or pellets can be made as follows.

A vinyl dryblend comprising a free-flowing homogeneous mixture of unfused thermoplastic vinyl resin particles, liquid vinyl plasticizers diffused in the resin particles, fillers, pigments, and a vinyl stabilizer, is readily formed by adding the resin, in the form of discrete particles, along with the vinyl resin plasticizer, such as di(2-ethyl hexyl) phthalate, butyl benzyl phthalate, epoxidized soybean oil, tricresyl phosphate, or other commonly used plasticizer, a filler, at least one pigment, and suitable vinyl resin stabilizer to a mixer or blender such as a Henschel blender, where they are mixed under moderate heat, for instance at a temperature of about 250° F. to about 375° F., for a period of time to ensure that the liquid plasticizer and stabilizer become absorbed and thus diffused throughout the resin particles. The remaining ingredients are absorbed thereon. Care is taken so that no fusion of the resin particles occurs during the mixing and the temperature must be kept below the point at which such fusion would occur. The vinyl dryblend can optionally contain processing aids such as stearic acid and the like.

One type of thermoplastic resin useful in the present invention includes resins capable of forming films and sheets. Such resins will primarily comprise the polymers and copolymers of vinyl chloride. Poly-(vinyl chloride) itself is the preferred resin, although copolymers of vinyl chloride with vinyl acetate, vinylidene chloride, other vinyl esters such as vinyl proprionate, vinyl butyrate, as well as alkyl substituted vinyl esters may be used. Vinyl chloride may also be copolymerized with a number of acrylic compounds such as acrylic acid and esters thereof and corresponding methacrylates. When unusually excellent properties of abrasion resistance, toughness, and tensile strength are not required, as may well be the case with wall coverings or other merely decorative applications, other materials may be used as a substitute to the thermoplastic resin. Examples of such materials include, but are not limited to, polystyrene, substituted polystyrene, polyethylene, polypropylene, acrylic acid, alkyl acrylic esters, alkyl methacrylic esters, and the like.

Generally speaking, the addition of fillers and pigments to the mixture may be made either initially; at the end of the mixing cycle when the resin particles remain relatively warm; or after the dryblend resin particles have been mixed and cooled. Fillers usable in this invention may include for example limestone, silica, diatomaceous earth, and clays. The pigments may be dry pigments, or pigment pastes in plasticizer. The color of the dryblend layer may be controlled over a wide range and a substantially transparent or translucent layer may be achieved by omitting the filler and most or all of the pigment from the vinyl dryblend. U.S. Pat. No. 3,958,043 describes materials and methods of making such particles, and is incorporated in its entirety by reference herein.

A typical formulation of pellets having the following composition is preferably prepared by a dry blend procedure using a Henschel mixer and then grounded into particles. The particles are then passed through the opening of a mesh screen, preferably larger than 6 mesh, but less than 100 mesh. The bulk density of pellets is preferably in the range of about 0.5 to about 0.8 grams per cubic centimeter. (The particle size is preferably greater than 0.0059" but smaller than 0.039".) It is preferred to have a larger amount of fine particles. For example, 70% of the particles are preferably smaller than 30 mesh screen. The preferred particle size distribution is 16% retained on 16 mesh screen (>0.0394"); 32% retained on 28 mesh (>0.234"); 19% retained on 48 mesh (>0.0117"); 30% retained on 100 mesh (>0.0059") and 4% retained on pan (<0.0059"). The bulk density of the pellets is preferably about 0.65 gram/cm$^3$.

| Formula A | Weight % |
| --- | --- |
| Suspension PVC (I.V. 0.92) | 27.70 |
| Calcium Carbonate | 53.54 |
| Dioctyl Phthalate | 14.60 |
| Organotin Stabilizer | 3.06 |
| Stearic Acid | 0.1 |
| Pigment (red, yellow, blue, etc.) | 1.00 |

The above-described material composition is one preferred type of accent particle used in the method of the present invention. It is to be emphasized that the types and proportions of the ingredients can be varied while keeping the requisite properties and characteristics of the resin particles for the process of the present invention. It should be noted that the color particles can be prepared by adding proper amounts of pigment during the mixing stage.

The color particles comprising the base layer, preferably a blend of multi-color particles, can be produced by blending numerous single color particles (i.e., primary particles) as described above, with a proper proportion ratio among each color with paste resin, plasticizer and stabilizer. The preferred color particle composition used to form the base layer can be made as follows:

| Formula B | % By Weight |
| --- | --- |
| Mixture Of Color Pellets of Formula A | 84.33 |
| Paste PVC resin (I.V. 1.0) | 11.30 |
| Dioctyl Phthalate | 3.70 |
| Zinc Stabilizer | 0.67 |

A mixture of single or multi-color primary particles or pellets can be coated uniformly with paste resin so that each particle moves or flows smoothly with respect to adjacent particles. It is preferred, but not necessary, to use such a coated color pellet mixture in the present invention. It is to be understood that the types and proportions of the additives can be varied while keeping the requisite properties and characteristics of the resin coated particles for the process of the present invention. Also, various types of resinous polymers can be employed instead of polyvinyl chloride such as polyvinyl acetate, polyvinyl fluoride polymers, mixtures and copolymers thereof and the like.

It should be noted that mixtures containing a variety of different color particles can be prepared to create various colors and shades thereof. Typically, the color particles used to form the base layer is a pellet blend of 5 to 6 different colors.

The size of the color particles can be any typical size used to make a base layer and is known to those skilled in the art. Preferably, the particle size is from about 8 mesh to about 100 mesh, and more preferably from about 16 mesh to about 50 mesh.

Figure 7:
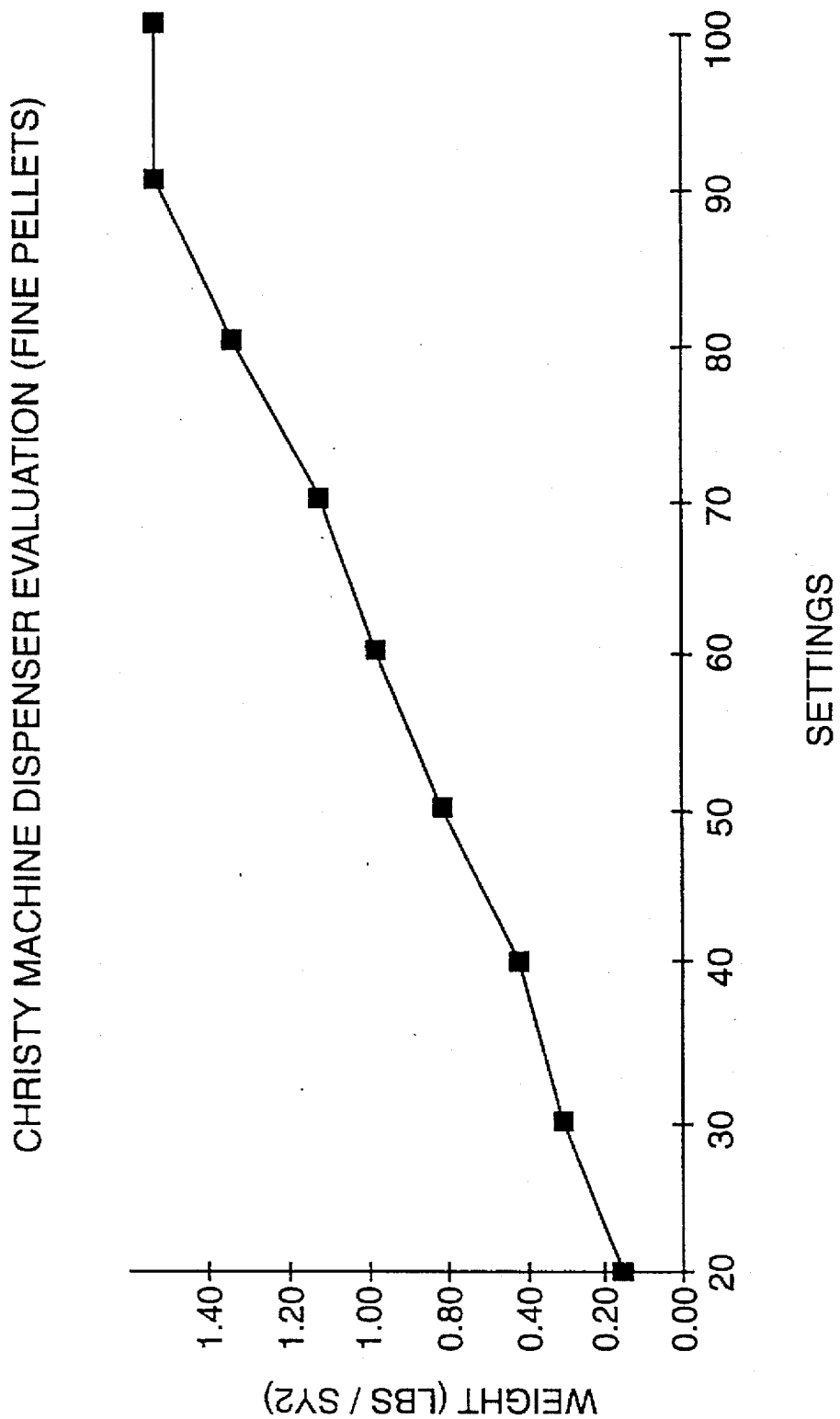
FIG. 7 is a graph of settings for a dispenser machine used in one or more steps of the present invention.

Any device can be used to deposit the color particles onto the moving carrier to form the base layer as long as the color particles are deposited in a relatively uniform thickness across the entire width of the moving carrier (e.g., up to 4 meters, preferably about 2 to about 2.5 meters). Preferably, as shown in FIG. 2, a pellet dispenser (56) is used to accomplish the laying of this uniform base layer (62). One preferred pellet dispenser is a Coat-O-Matic dispenser which is commercially available from CMC. FIG. 7 is a graph showing the settings used to obtain the laydown of pellets based on pounds per square yard.

The dispenser is equipped with an oscillating pellet feeder on top in the cross machine direction to feed material uniformly into a trough. The feeding speed is synchronized to the line speed. The amount of color particle or pellet lay-down on the carrier (to form the base layer) is controlled by the gap between the stationary levelling bar at the bottom of the pellet dispenser and the pellet carrier. The amount of color particle or pellet laydown is generally from about 100 mils to about 150 mils in thickness before any heating step but can be varied based on product specification. This thickness equates to approximately 2630 grams per square yard.

The base layer once formed on the carrier then comes in contact with a displaced mechanism device such as a patterned embossing device. An example of a patterned embossing device is roll, plate, or comb, which is preferably self-driven (but does not have to be self-driven), to create a depressed or displaced pattern image on the base layer. A patterned embossing roll is preferred.

The patterned embossing roll can be made of synthetic rubber, steel or similar material and is engraved with a relief pattern to emboss the base layer. The choice of using rubber or steel as the material for the embossing roll is dependent upon the complexity of the design. The advantages of using rubber embossing roll is the lower cost and shorter delivery time but the steel roll gives a subtle, undulating texture for large flat areas to disguise tracking, finely detailed designed elements at any desirable depth, controlled and variable embossing depths (multi-level) and wall angles. The steel embossing roll is also more durable.

The side walls of the engraving on a roll or plate can have angles from about 10 to about 90 degrees from vertical. The most preferred angle would be from about 50 to about 70 degrees from vertical. The embossing roll does not need to be heated or cooled in the present method, but it is optional. The engraved depth and width of the design pattern can be important to obtain a fine, delicate, and detailed effect of the pattern. The engraved depth can range from very shallow (e.g., less than 0.010") to deep (e.g., 0.750"), but preferably is from about 0.010" to about 0.080". The engraved depth of the design can be varied within the design or be all the same depth on the entire displaced mechanism device (e.g., the roll). The embossing roll is preferably gear driven and synchronized to the production line speed. Different speed ratios between, for instance, the embossing roll and the line speed can result in a desired smearing, distorting, or changing of the depressed or displaced pattern image embossed on the base layer.

Multiple displaced mechanism devices such as two or more pattern embossing rolls can be incorporated in the process to create a sophisticated design. For instance, a nine-inch tile design with veining in the tile block can be made by two embossed rolls. The first embossed roll can create a veining design on the virgin base layer, then the second embossed roll can create a geometric tile design on the embossed base layer without destroying the veining if the field areas of the second embossed roll are properly coordinated with a deeper engraved depth than the first embossed roll.

The two or more embossing rolls can have different circumferences. By having different circumferences, the pattern repeat length will increase far beyond the normal or standard embossing roll circumference, which is a desirable feature in surface coverings.

After the base layer is embossed/displaced and before applying accent particles, the base layer may optionally be heated to a sufficient state such that when the accent particles are deposited on the embossed surface of the base layer, the pattern on the base layer surface is not disturbed or distorted. This is especially preferred when using larger diameter accent particles. This optional heating step generally heats the top surface of the base layer to a temperature of from about 200° F. to about 500° F., preferably about 200° F. to about 300° F., for about 5 seconds to about 5 minutes.

Figure 1B:
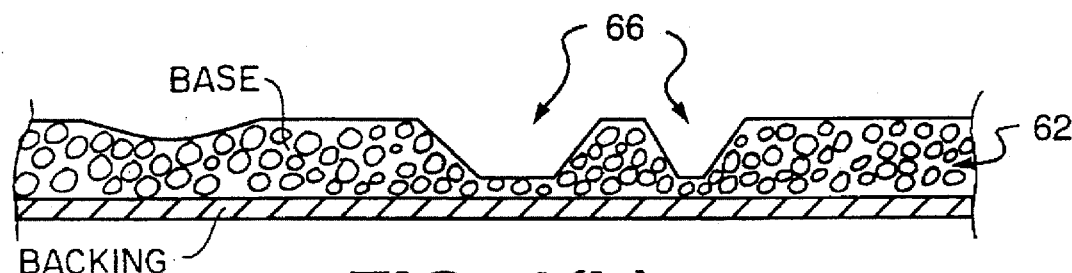
Figure 1C:
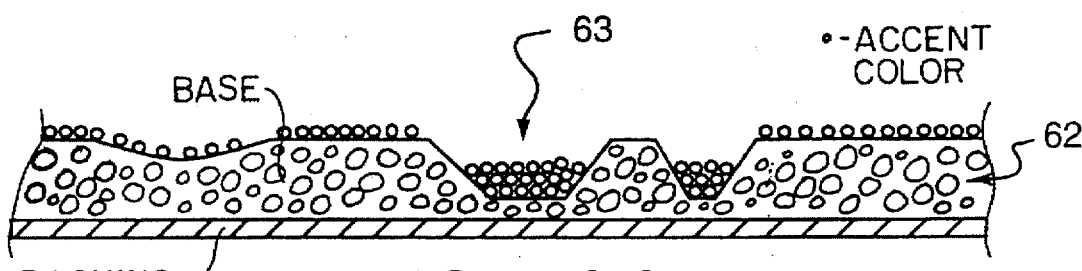
Figure 1D:
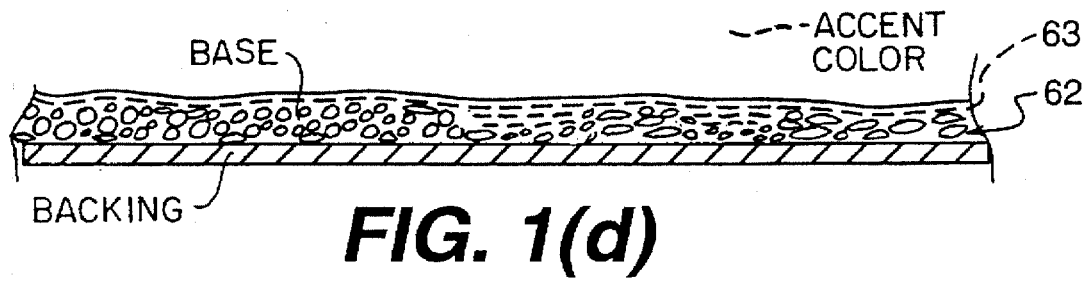
Figure 1E:
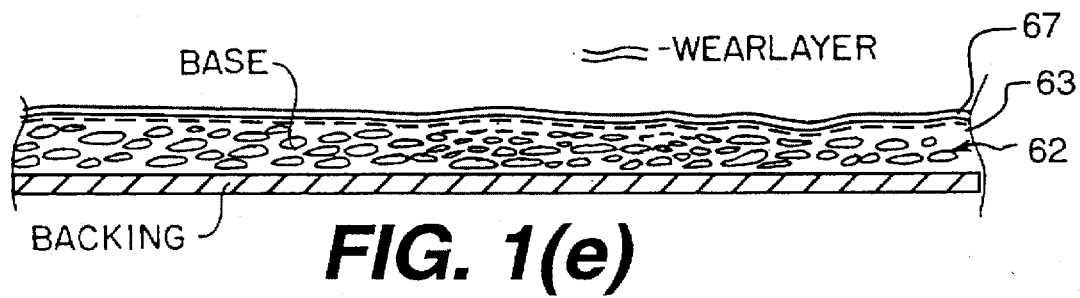

As shown in FIGS. 1(b)–(c) and 2, after the base layer (62) is embossed with one or more patterned embossing rolls (57) or plates or the like to create a depressed pattern image (66) on the base layer (62), accent particles (63), which are larger, smaller, or the same in diameter than the color particles (62) comprising the base layer (62), are substantially uniformly deposited or sprinkled over the embossed base layer (62).

Accent particles can be one or more of the following: single or multi-color particles; clear PVC particles; metal or mineral pigments such as alum; cellulosic particles such as wood; glass beads or particles; and pearlescent particles and mixtures thereof. Clear pellets add visual depth wherever they are placed. The higher the concentration of clear pellets in a given area, the greater the perceived visual depth.

The color pellets used as accent pellets, (i.e., primary pellets) are made of highly filled colored PVC pellets or homogeneous transparent PVC pellets. The primary pellets can range from having 1 to 30 colors blended together in a predetermined ratio. Generally, a mixture of four to eight colors is desirable. Other materials, such as acrylic pellets, can be used to achieve a desirable decorative effect. The primary pellets can also contain a material having a low melting temperature that would create an embossing effect on the base surface that would then register to the embossed and filled visual pattern.

Figure 3A:
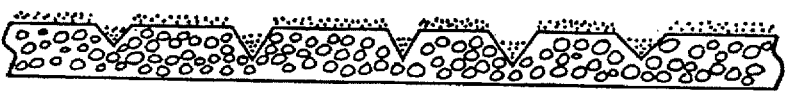
FIGS. 3(a)–(m) are enlarged side views of the base layer after pattern images have been formed and single color or multi-color particles have been deposited.
Figure 3B:
Figure 3C:
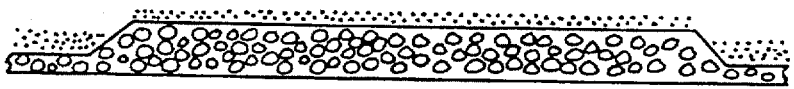
Figure 3D:
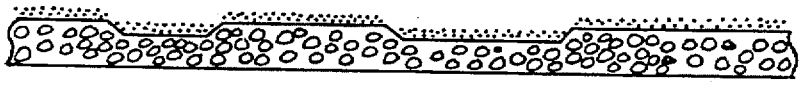
Figure 3E:
Figure 3F:
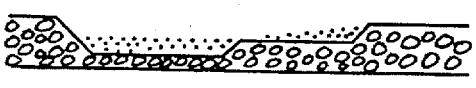
Figure 3G:
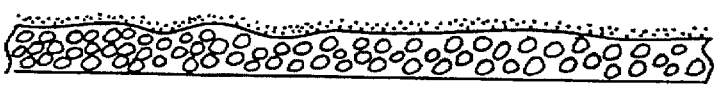
Figure 3H:
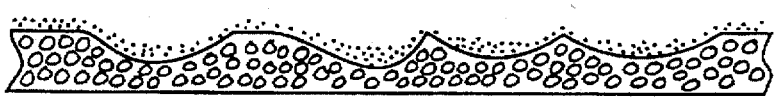
Figure 3I:
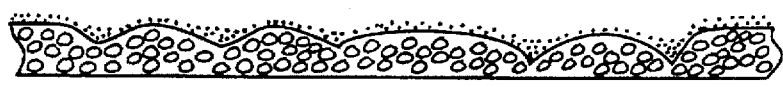
Figure 3J:
Figure 3K:
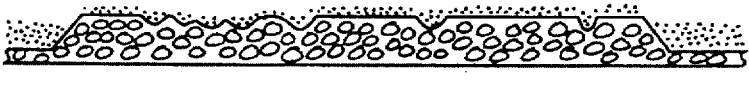
Figure 3L:
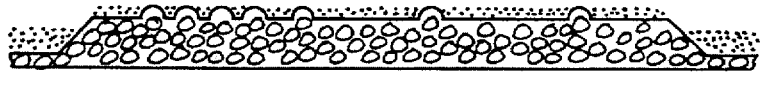
Figure 3M:

The sprinkled accent particles will have a tendency to settle more heavily into the embossed areas of the base layer. By embossing, various textures, line widths, design elements, a wide variety of shades, tones, and effects can be achieved within a single pattern. FIG. 1(c) provides one representation of how the accent particles tend to settle more heavily in the embossed areas. FIGS. 3(a)–(m) show the wide variety of concentrations of the accent particles that are possible based on the embossed pattern. In particular, FIG. 3(a) shows the effect of a narrow/small embossing width. FIG. 3(b) shows the effect of a medium embossing width. FIG. 3(c) provides an example of the effect obtained by large, flat unembossed areas and FIG. 3(d) provides an example of the effect when shallow, embossed areas exist. In addition, FIG. 3(e) provides examples of narrow or small raised (unembossed) areas, and FIG. 3(f) provides an example of raised (unembossed) areas along the edge of an embossed area. Other patterns that are possible are shown in FIG. 3(g) which provides an example of subtle undulating embossed texture and FIGS. 3(h) and (i) provide examples of a gradual embossing depth change. FIG. 3(j) provides an example on how embossed lines can be made in particular small or narrow raised (unembossed) areas. Large or wide raised (unembossed) areas are also possible as shown in FIG. 3(k). Finally, raised lines are also possible through the engraving step of the present invention such as that shown in FIGS. 3(l)–(m) which provide examples of raised (unembossed) areas that are close together and far apart, and large embossed areas.

To accomplish the depositing or sprinkling of these accent particles which preferably have a diameter of about 0.001" to about 0.150", and more preferably from about 0.001" to about 0.100", a fine pellet dispenser is preferably used. This dispenser is preferably a Christy Coat-O-Matic dispenser commercially available from Christy Machine Company.

The dispensing machine is designed to totally control the application of dry materials on products transported to it by conveyors or other means. Precise control of thickness of the coating and depositing the coating uniformly across the sheet are essential for the best appearance of the design. The preferred machine is equipped with a dispensing shaft, rotating at the base of a V-shaped hopper, that meters the flow of dispensed material. This shaft rotates against nylon brushes or wipers which remove the excess. Agitators are linked to the movable interior walls of the hopper to assure continuous flow and reduce bridging or hang-up of material in the hopper.

Types of dispensing shafts are chosen based on the size of coating materials and thickness of the coating to be produced. Knurled shafts generally are used to dispense fine, powdery media. Grooved shafts or spot-drilled shafts are used to dispense coarse or granular materials. The RPM of the dispensing shaft can be indefinitely varied by the motor control unit. The speed and diameter of the shaft affects the rate at which material is dispensed from the hopper to the product. FIG. 7 illustrates the dispensed weight in grams plotted against the speed setting of the shaft. The amount of the dispensed accent particles or pellets on the embossed pattern sheet is dependent upon the type of pattern, color combination, depth of the embossed pattern, and desirable appearance. The amounts of the dispensed accent pellets on the embossed sheet can be in the range of from about 50 grams/yd$^2$ to about 300 grams/yd$^2$; a more preferred range is from about 100 grams/yd$^2$ to about 200 grams/yd$^2$ the most preferred range is from about 130 grams/yd$^2$ to about 150 grams/yd$^2$.

If the amounts of dispensed accent pellets are not enough to fill the embossed areas, the appearance of the finished product after consolidation with heat and pressure provides a unique shallow embossing in registration to the design. If the amounts of dispensed pellets are too much, it covers the entire embossed base layer surface with accent pellets without the desired contrasting effect of color from the base layer to the colors of the accent pellets dispensed on embossed areas.

After the depositing of the accent particles, and as a separate step, clear PVC pellets can optionally be uniformly applied on top of the accent particles to create a visual depth appearance.

Also, after the depositing of accent particles, an optional step is to remove the accent particles that are resting on the unembossed or undisturbed surface. One or more of the following methods can be used to accomplish this desired effect: blowing the layer or sheet with a stream of air; vacuuming off these accent particles; vibrating the layer or sheet at a tilted angle; tilting the sheet at an extreme angle, causing the accent particles to roll off of the layer or sheet. This optional step will allow the accent particles that have previously settled in the embossed or disturbed areas ("valleys") to only remain on the base layer. This generally will lead to an appearance of the color particles of the base layer, as opposed to a blend of the color particles of the base layer and accent particles.

As shown in FIG. 2, in the process the accent pellets are subjected to high temperatures sufficient to cause partial melting of the resin granules at their points of contact, thereby forming bonds which result in the formation of the porous cohesive layer. This may be done by heating in an oven (59) (e.g., infrared oven), by using radiant heat, by hot air impingement, or by subjecting the particles to high pressures. A combination of heat and pressure could also be used to cause the desired degree of melting. If an oven is used, the oven should have the capability to adjust the temperature in both machine and cross machine directions. The times and temperatures involved are dependent on the formulations used. In the practice of this invention, the preformed sheet is preferably carried by the conveyor belt or substrate into a heated oven wherein the sheet assembly is heated at about 400° F. to about 420° F. for about 5 minutes to provide a fused or sintered sheet product. The thickness of the sheet may be in the range of from about 30 mils to about 80 mils. 68 mils is most preferred. A preferred temperature and time range is about 350° F. to about 482° F. for about 3 to about 10 minutes.

In the case of sheets having greater or lesser thicknesses, the temperature and/or time are appropriately adjusted to obtain a fused or sintered product without resin degradation.

As shown in FIG. 2, the sheet product is then passed through an overall embossing roll(s) (60,61) (having no pattern) to form depressions corresponding in outline configuration to the pattern image, usually preferably at a fixed gap of about 0.061" to about 0.064" between the steel embossing roll and the top surface of the Teflon® belt which is riding on top of the rubber roll at about 70° C. to about 80°

C. The overall embossing roll preferably is constructed with a hollow jacket that is continuously cooled down with 50° F. chilled water so as to maintain an embossing roll surface temperature of about 100° F. to about 130° F. during this consolidation process. The embossing roll diameter is mainly dependent upon line speed. For example, at a line speed of about 15 to 30 f.p.m., an acceptable diameter for an embossing roll is 24 inches. The texture on the overall embossing roll is preferably a non-register overall pattern. In the alternative, the embossing roll could contain a pattern that would register to the visual pattern.

After the overall or final embossing step, various backing materials can be applied to the finished product. The same backing materials traditionally used in this industry can be used with the product of the present invention. For instance, felt can be laminated on the backside of the consolidated material with lamination adhesive. Or, a rubber sheet can be laminated to the backside by well-known laminating processes used in the industry. A synthetic fiberglass mat could also be used on the back. Also, the product of the present invention could be used without a backing material because it can be made into a homogenous PVC sheet.

A clear or colored coating of a thermoplastic resin or UV curable coating may be sprayed, doctored, air-knife coated, or roll applied over the entire sheet in any manner known to those skilled in the art. The final coating may contain a flatting agent to control the gloss. Such coatings may comprise a plastisol or organosol, dryblend, or UV curable material; it normally will have little pigment or filler therein. This clear coat will be the final coat and will overlay the embossed inlaid layer which has previously been applied to the thermoplastic sheet. The clear coat will also either fuse or cure by heat or UV radiation and become an integral part of the system covering.

Figure 4:
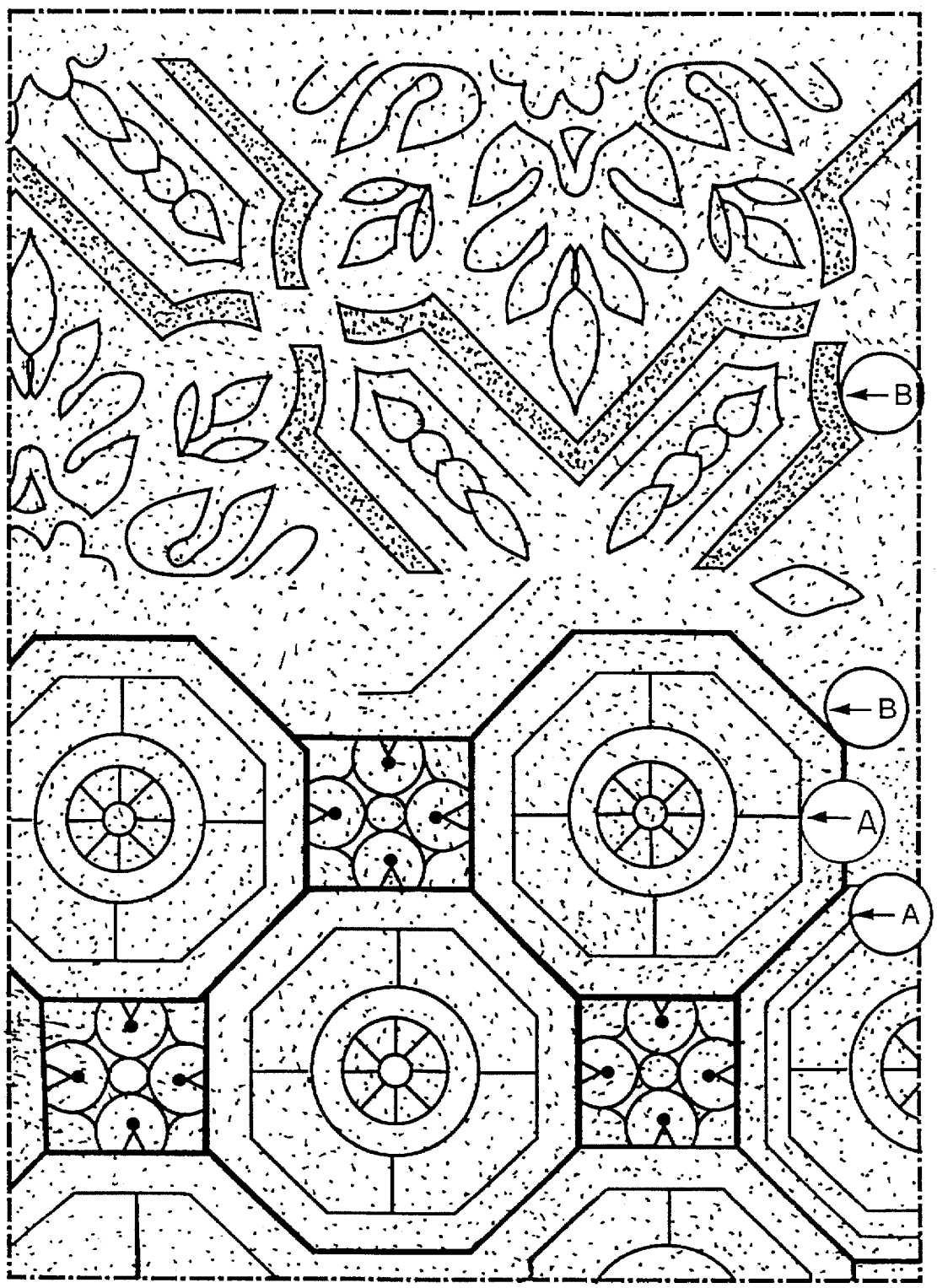
FIGS. 4–6 are photocopies of representative surface coverings of the present invention.
Figure 5:
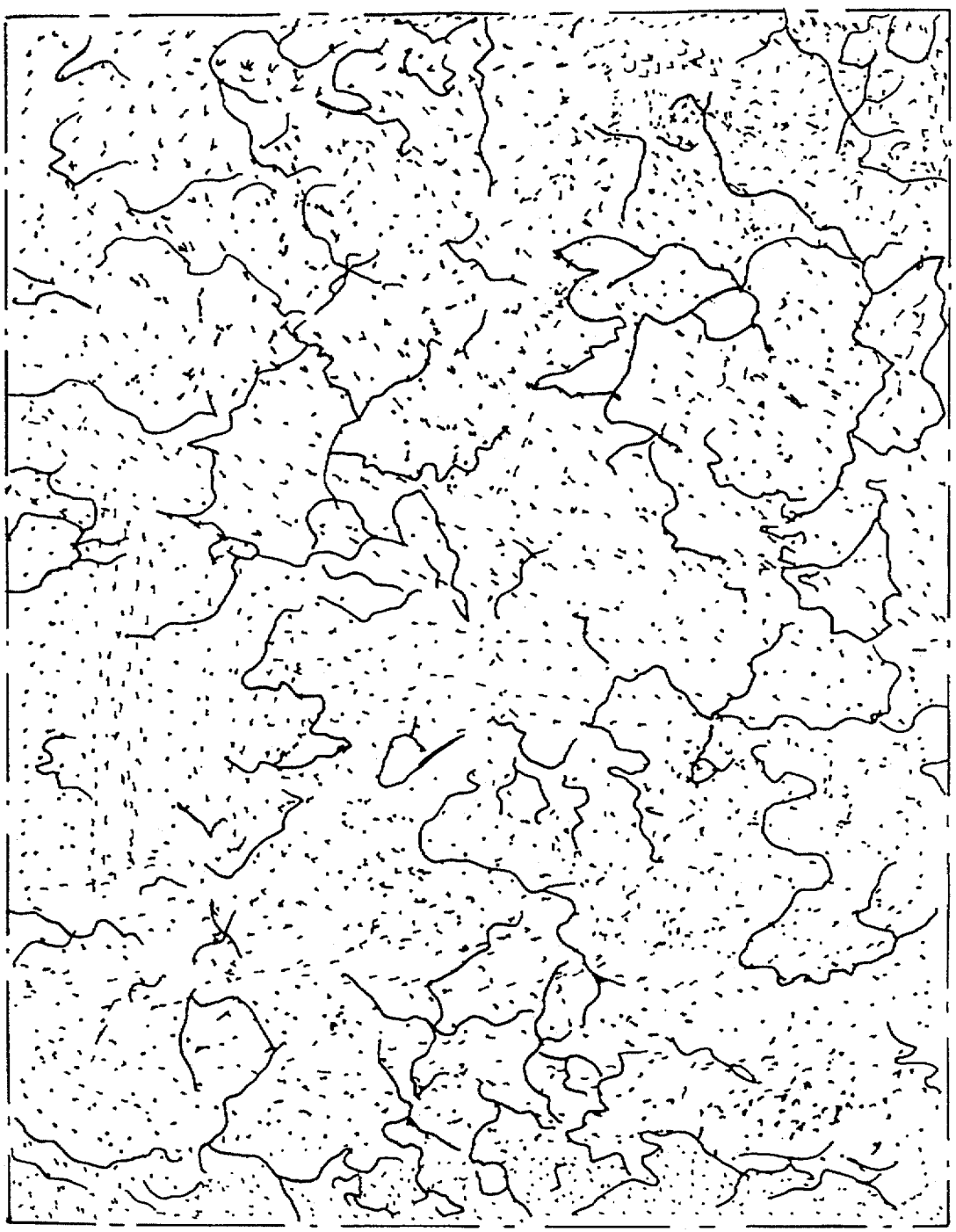
Figure 6:
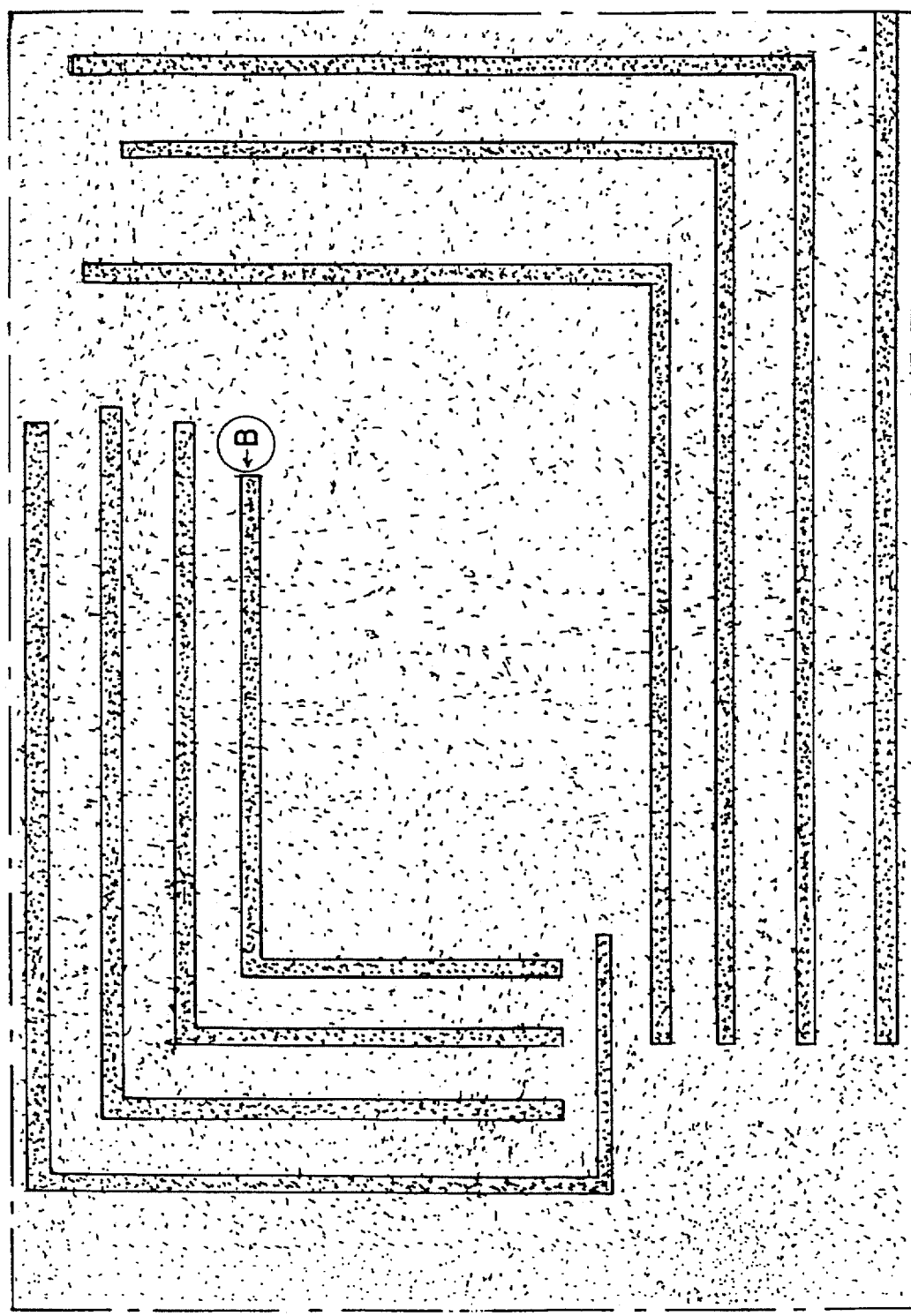

FIGS. 4, 5, and 6 are examples of the type of designs possible using the process of the present prevention.

The present invention will be further clarified by the following examples, which are intended to be purely exemplary of the invention.

EXAMPLE

A single mixture of formula B was prepared with the following weight percentages (based on the total weight of formula B) of colored pellets: 27.83 wt % light beige; 19.82 wt % medium beige; 15.18 wt % white; 11.81 wt % light brown; 5.90 wt % medium brown; 2.53 wt % brown; and 1.26 wt % mauve. This mixture of colored pellets was mixed together with paste PVC resin (Inherent Viscosity of 1.0), dioctyl phthalate, and zinc stabilizer. The blended mixture was poured into a hopper with a 20"×20" Teflon sheet (belt) positioned underneath. The leading edge of the Teflon sheet was pulled underneath the hopper at a speed of 2" per second using a wire hooked into a punched hole on the leading edge of the sheet. A 3" diameter leveling bar was set at 0.145" between the sheet and leveling bar. The mixture was applied onto the Teflon sheet by means of the hopper and then the sheet was passed underneath the leveling bar to create the base layer. 2,200 grams/square yard of color particles were applied in this manner having a mesh size 10 mesh thru. The Teflon sheet containing the base layer was then placed on a 20"×20" steel plate (1/16" thick plate).

An embossing plate having a swirl pattern design was used to emboss the top surface of the base layer and the plate containing the base layer was placed in a Blue M oven (model #DC-256C G.O.P.) for 3 minutes at 400° F. The sample was then removed from the oven and allowed to cool for 1 to 3 minutes. A blend of accent particles, each having the composition of formula A, was made. The blend had the following weight % of various colored accent pellets: 30 wt % beige; 22 wt % tan; 15 wt % light brown; 8 wt % gray-brown; 6 wt % white; 4 wt % mauve; 4 wt % green; 5 wt % light blue; 3 wt % blue; and 3 wt % orange. The coating weight of the accent particles was 97 grams/square yard. 57 wt % of the accent pellets were larger than 48 mesh but smaller than 16 mesh; 43 wt % were larger than 16 mesh. The accent particles were evenly applied to the top surface of the base layer using a 2½" wide Christy dispenser machine (Coat-O-Matic model) having a 1" knurled roll #18. 97.12 grams per square yard of accent particles were applied in this manner.

Afterwards, clear PVC pellets were applied (larger than 28 mesh retained) also using the Christy machine. The amount of clear PVC pellets was 45.36 grams per square yard.

The 20"×20" sample was then placed again into the same oven for 12 minutes at 400° F. The sample was then pressed by placing a steel Teflon coated embossing plate face down on top of the sample. The sample was placed in a Walbash Metal Product Press (model 100-2424-2 TM) and sandwiched between two 1" thick 20"×20" felt pads and pressed at 50 ton for 4 minutes using no heat. The sample was removed from the embossing plate and the Teflon sheet removed. The sample was cut to a size of 18"×18". To laminate the sample to the felt backing, approximately a 0.0015" thick adhesive was applied to the back surface of the sample. The felt backing (Arjo felt) was laminated to the adhesive backed sample. A heavy roller was used to bond the sample to the backing and remove any air bubbles. The sample was then placed in the Blue M oven at 200° F. for 3 minutes and removed. The sample was allowed to cool. Approximately 1.0 mil of Lords U312 urethane coating (a UV curable low gloss urethane coating) was applied to the top surface of the sample using an airknife. The sample was then cured in a Geo Hetek processor (model #QO-0244 AN) by passing the sample through at 30 f.p.m.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for making a surface covering product comprising the steps of:
    (a) depositing color particles on a carrier to form a base layer having a top surface wherein said color particles comprise thermoplastic resin and pigment;
    (b) forming a depressed or displaced pattern image on said top surface of said base layer;
    (c) depositing accent particles on the top surface of said base layer having the depressed or displaced pattern image wherein at least a portion of said accent particles are deposited within the depressed or displaced pattern image;
    (d) subjecting said base layer to heat and/or pressure to consolidate said accent and color particles and form a preformed mass; and
    (e) pressing said preformed mass to form a fused, surface covering product.

2. The method of claim 1, wherein prior to depositing said accent particles, said base layer is heated to a sufficient temperature and time such that the depressed or displaced pattern image on said base layer is not disturbed or distorted when said accent particles are deposited thereon.

3. The method of claim 1, further comprising between step (c) and step (d), removing said accent particles located on non-depressed or non-displaced areas on the base layer.

4. The method of claim 3, wherein said accent particles located on non-depressed or non-displaced areas are removed by blown air, vacuum, vibration, or tilting of the base layer.

5. The method of claim 1, wherein said color particles are single colored particles.

6. The method of claim 1, wherein said color particles are multi-color blends of particles.

7. The method of claim 1, wherein said carrier is a moving carrier having a line speed of from about 15 to about 30 feet per minute.

8. The method of claim 1, wherein said color particles comprise PVC pellets and at least one color pigment blended with said PVC pellets.

9. The method of claim 1, wherein said accent particles comprise at least one color pigment, a PVC resin, a filler, a plasticizer, and a heat stabilizer.

10. The method of claim 1, wherein said color particles comprise at least one pigment, a paste resin, a plasticizer, and a stabilizer.

11. The method of claim 1, wherein said color particles deposited to form said base layer have a particle size range of from about 8 mesh to about 100 mesh.

12. The method of claim 11, wherein said particle size range is from about 16 mesh to about 50 mesh.

13. The method of claim 1, wherein said base layer has a thickness of from about 100 mils to about 150 mils.

14. The method of claim 1, wherein a pellet dispenser deposits said color particles to form said base layer.

15. The method of claim 1, wherein at least one displaced mechanism device forms said depressed or displaced pattern image on said base layer.

16. The method of claim 15, wherein said displaced mechanism device is at least one pattern embossing device.

17. The method of claim 16, wherein said pattern embossing device is selected from the group consisting of a roll, a plate, and a comb.

18. The method of claim 17, wherein two or more embossing rolls are used as the pattern embossing device.

19. The method of claim 18, wherein said embossing rolls have different circumferences.

20. The method of claim 1, wherein said depressed or displaced pattern image has side walls having angles from about 10 to about 90 degrees from vertical.

21. The method of claim 20, wherein said angles range from about 50 to about 70 degrees from vertical.

22. The method of claim 1, wherein said depressed or displaced pattern image has an engraved depth ranging from about 0.010 inch to about 0.080 inch.

23. The method of claim 1, wherein said accent particles are selected from the group consisting of single or multi-color particles, clear PVC particles, metal pigments, mineral pigments, cellulosic particles, glass beads, pearlescent particles, and mixtures thereof.

24. The method of claim 23, wherein said accent particles are single or multi-color particles.

25. The method of claim 1, wherein said accent particles have a diameter of from about 0.001 inch to about 0.150 inch.

26. The method of claim 25, wherein said accent particles have a diameter of from about 0.001 inch to about 0.100 inch.

27. The method of claim 1, wherein said accent particles are deposited on said base layer in an amount ranging from about 50 grams/yd$^2$ to about 300 grams/yd$^2$.

28. The method of claim 27, wherein said amount is from about 100 grams/yd$^2$ to about 200 grams/yd$^2$.

29. The method of claim 1, wherein between step (b) and step (c), said base layer having the depressed or displaced image is heated to a temperature of from about 350° F. to about 500° F. for about 3 to about 10 minutes.

30. The method of claim 1, wherein after a fused, surface covering product is formed having a top surface, a backing material is applied to a surface opposite to the said top surface.

31. The method of claim 1, wherein a clear or colored coating of a thermoplastic resin or UV-curable coating is applied to a top surface of the surface covering product.

32. A surface covering product made from the method of claim 1.

33. A surface covering product made from the method of claim 30.

34. A surface covering product made from the method of claim 31.

35. The surface covering product of claim 32, wherein said product is floor covering.

36. The surface covering product of claim 32, wherein said product is wallpaper, a countertop, or a laminate.

37. The method of claim 1, wherein said thermoplastic resin is a polyvinyl acetate, a polyvinyl fluoride polymer, copolymers thereof, or mixtures thereof.

38. The method of claim 1, wherein said thermoplastic resin is a polystyrene, a polyethylene, a polypropylene, an acrylic acid resin, an alkyl acrylic ester resin, an alkyl methacrylic ester resin, a copolymer of vinyl chloride and vinyl acetate, a copolymer of vinyl chloride and vinylidene chloride, a copolymer of vinyl chloride and a vinyl ester, a copolymer of vinyl chloride and an acrylic acid, or a copolymer of vinyl chloride and an ester of an acrylic acid.

* * * * *